US012790800B2

(12) United States Patent
Huang et al.

(10) Patent No.: US 12,790,800 B2
(45) Date of Patent: Nov. 10, 2026

(54) DOUBLE-SEALED FAUCET WITH A ROTATABLE WATER OUTLET HOSE

(71) Applicant: CLEMENT INC., Flushing, NY (US)

(72) Inventors: Lengjie Huang, Quanzhou (CN); Chunhua Wang, Wuhan (CN); Changzheng Ni, Xiamen (CN); Yongqiang Yan, Fuzhou (CN)

(73) Assignee: CLEMENT INC., Flushing, NY (US)

( * ) Notice: Subject to any disclaimer, the term of this patent is extended or adjusted under 35 U.S.C. 154(b) by 0 days.

(21) Appl. No.: 18/673,170

(22) Filed: Jun. 12, 2024

(65) Prior Publication Data

US 2025/0382781 A1 Dec. 18, 2025

(51) Int. Cl.
*E03C 1/04* (2006.01)
*F16K 11/078* (2006.01)

(52) U.S. Cl.
CPC .......... *E03C 1/0412* (2013.01); *E03C 1/0404* (2013.01); *F16K 11/0785* (2013.01); *E03C 2001/0415* (2013.01); *Y10T 137/9464* (2015.04)

(58) Field of Classification Search
CPC ................. E03C 1/0412; E03C 1/0404; E03C 2001/0415; F16K 11/0785; Y10T 137/9464
USPC .................................................. 137/801, 359
See application file for complete search history.

(56) References Cited

U.S. PATENT DOCUMENTS

| | | | | |
|---|---|---|---|---|
| 3,973,791 | A * | 8/1976 | Porta | F16L 33/2073 285/305 |
| 5,332,268 | A * | 7/1994 | Godeau | F28F 9/0258 285/305 |
| 5,669,417 | A * | 9/1997 | Lian-Jie | E03C 1/0404 137/606 |
| 6,073,972 | A * | 6/2000 | Rivera | E03C 1/04 285/82 |
| 8,631,816 | B2 * | 1/2014 | Hsu | E03C 1/04 4/677 |
| 9,206,917 | B2 * | 12/2015 | Lin | E03C 1/0403 |
| 9,334,634 | B2 * | 5/2016 | Bares | F16L 37/00 |
| 10,233,617 | B1 * | 3/2019 | He | E03C 1/0404 |
| 11,479,952 | B2 * | 10/2022 | Rowe | E03C 1/0411 |
| 2014/0116553 | A1 * | 5/2014 | Schoolcraft | E03C 1/057 137/801 |

* cited by examiner

*Primary Examiner* — Daphne M Barry

(57) ABSTRACT

A double-sealed faucet with a rotatable water outlet hose includes a valve core seat and a water outlet hose. The valve core seat includes a mixing chamber and a first water outlet end having a first annular wall and a second annular wall arranged in two layers and concentrically. An upper end of the first annular wall is provided with several first sealing members. The water outlet hose includes a water passage channel and a second water inlet end having several second sealing members, the first sealing members are matched with an inner wall surface of the water passage channel to form a first seal, an inner side of the first annular wall communicates with the water passage channel, and the second sealing members are matched with an inner wall surface of the second annular wall to form a second seal.

11 Claims, 9 Drawing Sheets

DOUBLE-SEALED FAUCET WITH A ROTATABLE WATER OUTLET HOSE

TECHNICAL FIELD

The present disclosure relates to the field of sanitary ware, in particular to a double-sealed faucet with a rotatable water outlet hose.

BACKGROUND

There are various types of kitchen faucets. There is a type of kitchen faucet with a spring at the water outlet end which is called a spring kitchen faucet. In this type of faucet, a flexible hose is installed in a spring at the water outlet end which brings a basic feature that the water outlet hose therein and the spring have certain flexibility, so that the water sprayer can be taken out from the arm, and combined with the rotation of the arm, water can be discharged in all directions within a certain range. In addition, compared with the pull-down kitchen faucet, the kitchen spring faucet has shorter hose and with the support of the spring the water sprayer will not unintentionally fall into the kitchen sink and be contaminated by dirty water. Therefore, the spring faucet is quite popular with professional chefs in hotel kitchens or corporations where a large amount of food needs to be prepared. However, nowadays, the water outlet hose and the valve core seat of this type of kitchen spring faucet is basically sealed through an upper sealing member on the water outlet hose, and failure of the sealing will cause water leakage of the faucet.

SUMMARY

The present disclosure provides a double-sealed faucet with a rotatable water outlet hose, which can effectively solve the above-mentioned problem.

The present disclosure is realized by the following solutions.

A double-sealed faucet with a rotatable water outlet hose, comprising:

- a valve core seat, wherein the valve core seat includes a mixing chamber and a first water outlet end communicating with the mixing chamber, the first water outlet end has a first annular wall and a second annular wall arranged in two layers from inside to outside, the first annular wall and the second annular wall are arranged concentrically, the first annular wall is higher than the second annular wall, and an upper end of the first annular wall is provided with a plurality of first sealing members; and
- a water outlet hose, wherein the water outlet hose includes a water passage channel and a second water inlet end communicating with the water passage channel, the second water inlet end is provided with a plurality of second sealing members, the second water inlet end is inserted into the first water outlet end, the first sealing members are matched with an inner wall surface of the water passage channel to form a first seal, an inner side of the first annular wall communicates with the water passage channel, and the second sealing members are matched with an inner wall surface of the second annular wall to form a second seal.

As a further improvement, an end of the second annular wall near the water outlet hose is provided with a plurality of through grooves, the second water inlet end is provided with a second engagement groove having an annular profile, when the water outlet hose is inserted into the valve core seat, the through grooves correspond to the second engagement groove, and a fastener passes through the through grooves from an outer side of the second annular wall to be engaged with the second engagement groove.

As a further improvement, two through grooves are provided, and the two through grooves are arranged oppositely, the fastener includes an outer wall having an opening and a fastening protrusion provided on an inner side of the outer wall, and the fastening protrusion corresponds to the through grooves.

As a further improvement, the second water inlet end is provided with a plurality of second sealing grooves, and the second sealing members are sleeved on the second sealing grooves, the second sealing grooves are provided below the second engagement groove.

As a further improvement, the valve core seat further includes a first water inlet end, the first water inlet end is provided with at least two water inlet ports, each water inlet port is connected to a water inlet pipe by insertion, and the water inlet pipe is fixed to the first water inlet end by a fixing plate.

As a further improvement, the water inlet pipe is provided with a first engagement groove having an annular profile, the fixing plate is provided with a slot and through holes on both sides of the slot, the first water inlet end is provided with at least two first fixing holes, the first fixing holes are arranged corresponding to the through holes, the water inlet pipes are inserted into the water inlet ports, the fixing plate is inserted into the first engagement groove from a side of the water inlet pipe through the slot, the first fixing holes are aligned with the through holes, and the fixing plate is fixed to the valve core seat by a first screw.

As a further improvement, a main body is further included, the main body includes a hollow cavity, and an upper port and a lower port communicating with the hollow cavity, the upper port has a first positioning shoulder, the valve core seat enters from the lower port and is accommodated in the hollow cavity, and the valve core seat is limited by the first positioning shoulder.

As a further improvement, a support frame is further included, a lower end of the support frame is provided with a rotating part and a positioning part from bottom to top, the upper port also has a second positioning shoulder, the second positioning shoulder is arranged above the first positioning shoulder, and a first gasket is arranged on the second positioning shoulder; a guide ring and an engagement ring are sleeved on the rotating part, the rotating part is inserted into the upper port, and the positioning part is limited by the second positioning shoulder and placed on the first gasket; a sidewall of the main body is provided with a second fixing hole, and a second screw is fixed to the second fixing hole and is biased against the engagement ring.

As a further improvement, an upper end of the support frame is provided with a support arm that is perpendicular to the lower end of the support frame. A first end of the support arm is provided with a connection hole, and a second end of the support arm is provided with a positioning opening. The positioning opening is located on a side away from the second water inlet end of the water outlet hose, the connection hole is connected to a support pole, a spring is sleeved on the support pole, and the water outlet hose passes through the spring and the support pole, the water outlet end of the water outlet hose is clamped on the positioning opening.

As a further improvement, an inner wall surface of the lower port is provided with a first connection part, the first connection part is connected to an adapter, an inner wall surface of the adapter is provided with a second connection part, and the second connection part is connected with a support pipe, and a movable quick-release nut is sleeved on the support pipe.

As a further improvement, a panel, a bottom plate, and a second gasket are movably connected to the support tube in sequence, and the panel, the bottom plate, and the second gasket are provided between an end surface of the lower port and the quick-release nut.

As a further improvement, a valve core, a nut arranged on the valve core by pressing, a flange covering the nut, and a handle are further included. The main body further includes a side port communicating with the hollow cavity, the valve core enters the hollow cavity from the side port and is biased against the valve core seat, the nut tightly compresses the valve core and is locked to the side port, and a connection handle of the valve core passes through the nut and the flange, and the handle is connected to the connection handle of the valve core to operate the valve core.

The present disclosure has the following advantages: a joint structure with two annular walls is provided at the water outlet end of the water outlet hose to enhance the sealing structure between the water outlet hose and the valve core seat, so as to form a double-sealed structure. When the sealing of the water outlet hose fails, the valve core seat can act to provide the sealing function, thereby reducing the risk of water leakage due to seal failure of the faucet and increasing the service life of the faucet. Moreover, by connecting the water outlet hose and the valve core seat with a fastener, the water outlet hose and the valve core seat can be quickly installed together, and the water outlet hose and the spring can be freely rotated 360°, so as to prevent winding. Further, a fixing plate is arranged between the water inlet pipe and the valve core seat, the fixing plate clamps the water inlet pipe, so that the water inlet pipe can rotate individually without coming off, thereby preventing the water inlet pipe from being winded up and sheared.

BRIEF DESCRIPTION OF THE DRAWINGS

In order to more clearly illustrate the technical solutions of the embodiments of the present disclosure, the drawings required for the illustration of the embodiments will be briefly introduced below. It should be understood that the following drawings only show certain embodiments of the present disclosure and therefore should not be regarded as limiting the scope of the present disclosure. For those of ordinary skill in the art, other related drawings can be obtained based on these drawings without creative efforts.

Figure 1:
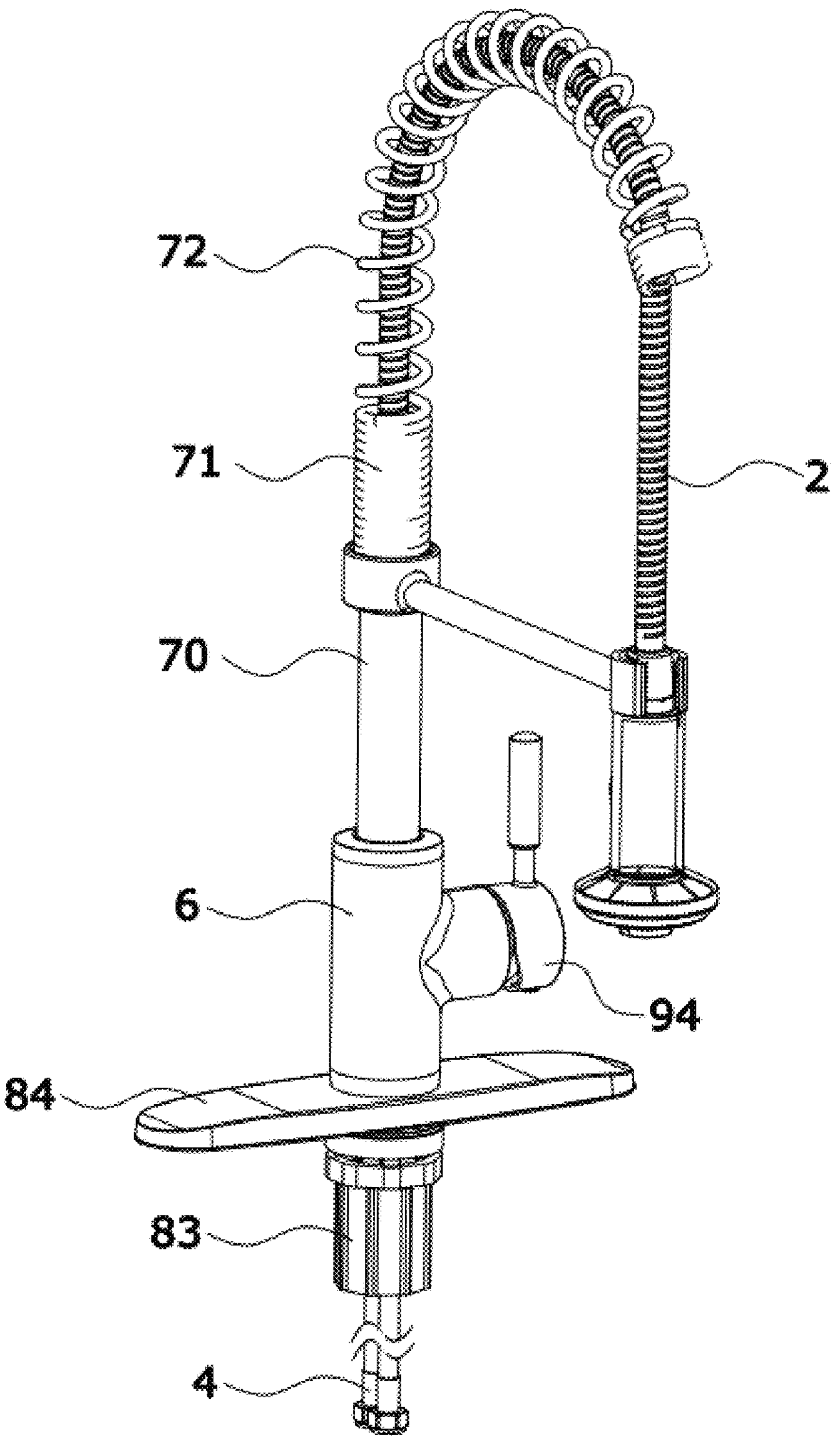
FIG. 1 is an isometric view of an embodiment of the present disclosure.

Reference numerals in the drawings are listed below:

1. valve core seat; 11. mixing chamber; 12. first water outlet end; 121. first annular wall; 122. second annular wall; 123. through groove; 13. first sealing member; 14. first water inlet end; 141, water inlet port; 142, first fixing hole;

2. water outlet hose; 21. water passage channel; 22. second water inlet end; 221. second engagement groove; 222. second sealing groove; 23. second sealing member;

3. fastener; 31. outer wall; 32. fastening protrusion;

4. water inlet pipe; 41. first engagement groove;

5. fixing plate; 50. first screw; 51. slot; 52. through hole;

6. main body; 61. hollow cavity; 62. upper port; 621. first positioning shoulder; 622. second positioning shoulder; 623. first gasket; 624. second fixing hole; 625. second screw; 63. lower port; 631. first connection portion; 64. side port;

70, support frame; 701, rotating part; 702, positioning part; 703, guide ring; 704, engagement ring; 705, support arm; 706, connection hole; 707, positioning opening; 71, support pole; 72, spring;

81. adapter; 811. second connection part; 82. support tube; 83. quick-release nut; 84. panel; 85. bottom plate; 86. second gasket;

91. valve core; 92. nut; 93. flange; 94. handle.

DETAILED EMBODIMENTS OF THE DISCLOSURE

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments merely include some of the embodiments of the present disclosure rather than all. Based on the embodiments of the present disclosure, all other embodiments obtained by those of ordinary skill in the art without creative efforts fall within the scope of protection of the present disclosure. Accordingly, the following detailed description of embodiments of the disclosure illustrated in the accompanying drawings is not intended to limit the scope of the claimed disclosure, but rather to represent selected embodiments of the disclosure.

In the description of the present disclosure, the terms "first" and "second" are used for descriptive purposes only and should not be understood as indicating or implying relative importance or implicitly indicating the number of the indicated technical features. Thus, a feature defined as "first" or "second" may explicitly or implicitly include one or more of the features. In the description of the present disclosure, the meaning of "plurality" is two or more, unless otherwise clearly and specifically defined.

Referring to FIGS. 1-11, a double-sealed faucet with a rotatable water outlet hose 2 includes a main body 6, a valve core seat 1 and a valve core 91 arranged in the main body 6, a water outlet assembly arranged above the main body 6, an installation assembly and a water inlet pipe 4 arranged below the main body 6, and a handle 94 arranged on a side of the main body 6. An end of the water inlet pipe 4 is connected to the valve core seat 1, and the other end of the water inlet pipe 4 is connected to the water supply, the installation assembly fixes the faucet on the installation table, and the handle 94 is connected to the valve core 91. The water flow enters from the water inlet pipe 4 and passes through the valve core seat 1 and the valve core 91. The valve core 91 is controlled through the handle 94 to regulate the quantity of water intake and the ratio of hot and cold water, and then the water flow runs through a mixing chamber 11 of the valve core seat 1 to the water outlet assembly for dispensing.

Figure 5:
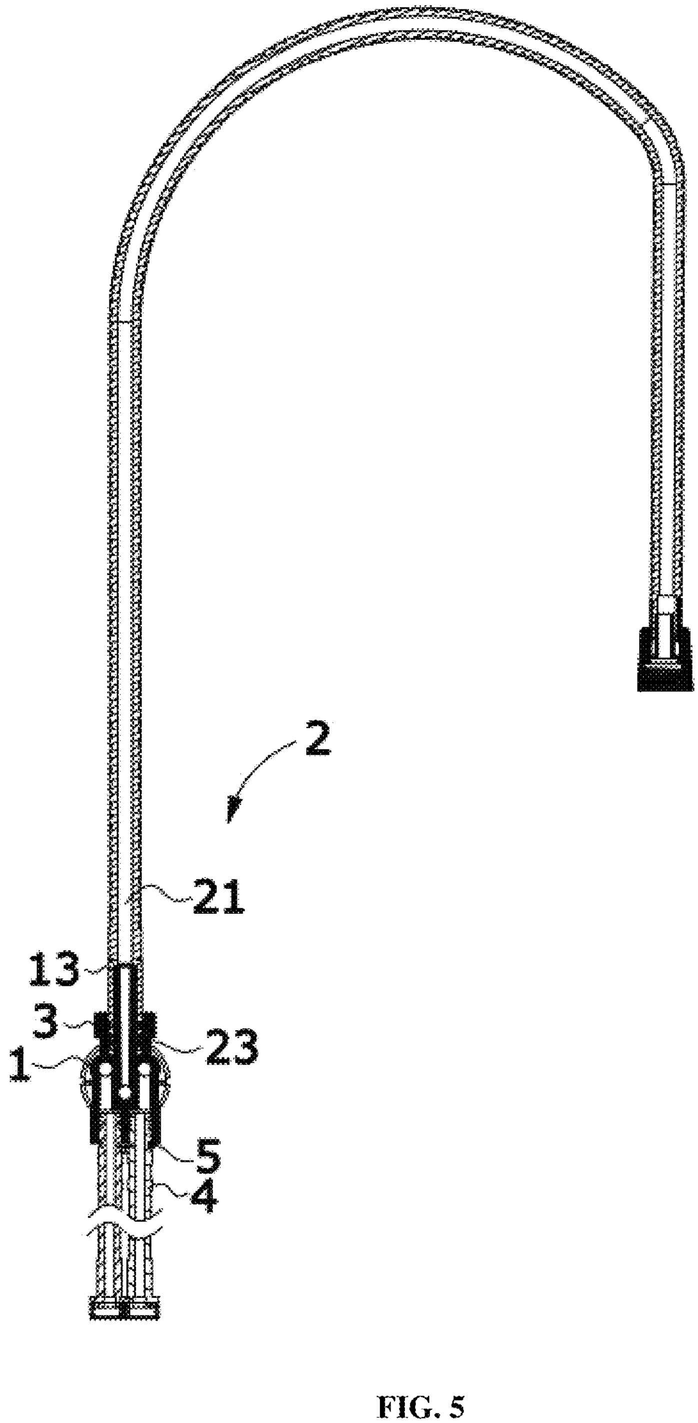
FIG. 5 is a cross-sectional view showing that a valve core seat is connected to a water inlet pipe and a water outlet hose according to an embodiment of the present disclosure.

Referring to FIG. 5, the main body 6 includes a hollow cavity 61, an upper port 62, a lower port 63, and a side port 64. The upper port 62, the lower port 63, and the side port 64 communicate with the hollow cavity 61. The upper port 62 has a first positioning shoulder 621, the valve core seat 1 enters from the lower port 63 and is accommodated in the hollow cavity 61. The valve core seat 1 is limited by the first positioning shoulder 621 and cannot move upward. The valve core 91 enters the interior of the hollow cavity 61 from the side port 64 and is biased against the valve core seat 1. A nut 92 is used to tightly compress the valve core 91 and the nut 92 is locked and fixed to the side port 64. A flange 93 is covered on the nut 92 to hide the nut 92 and modify the appearance of the faucet. The connection handle of the valve core 91 passes through the nut 92 and the flange 93, and the handle 94 is connected to the connection handle of the valve core 91 to control the valve core 91.

Figure 6:
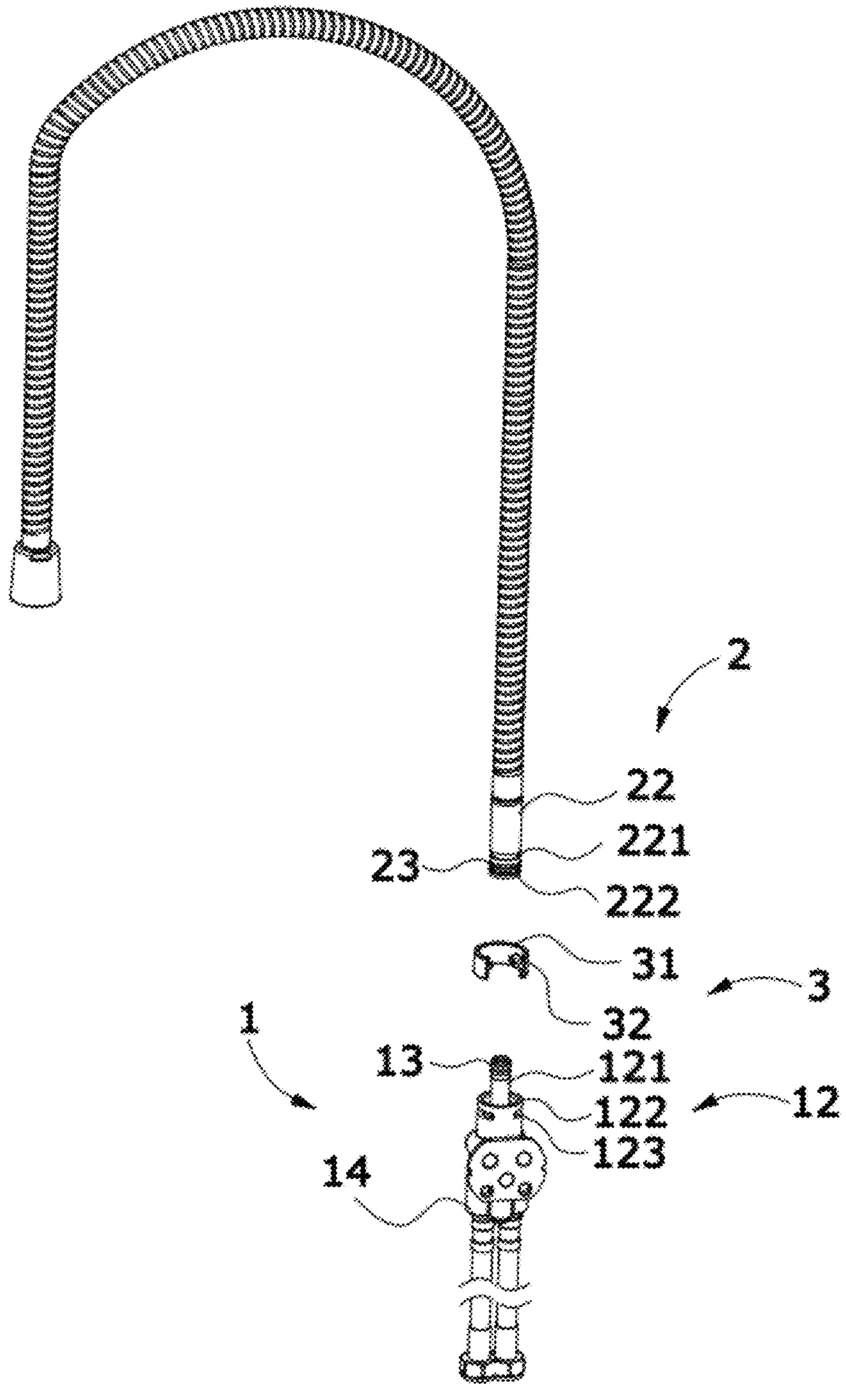
FIG. 6 is an exploded view of the valve core seat and the water outlet hose according to an embodiment of the present disclosure.

Referring to FIG. 6, the valve core seat 1 includes the mixing chamber 11, a first water outlet end 12 and a first water inlet end 14. The first water outlet end 12 and the first water inlet end 14 communicate with the mixing chamber 11. The first water outlet end 12 communicates with the water outlet assembly, and the first water inlet end 14 communicates with the water inlet pipe 4.

The first water outlet end 12 has a first annular wall 121 and a second annular wall 122 respectively arranged from inside to outside in an annular manner. The first annular wall 121 and the second annular wall 122 are arranged concentrically, and the first annular wall 121 is higher than the second annular wall 122. An upper end of the first annular wall 121 is provided with a plurality of first sealing grooves, and first sealing members 13 are sleeved on the first sealing grooves. The water outlet assembly includes a water outlet hose 2, the water outlet hose 2 includes a water passage channel 21 and a second water inlet end 22 in communication with the water passage channel 21. The second water inlet end 22 is provided with a plurality of second sealing grooves 222, and second sealing members 23 are sleeved on the second sealing grooves 222. The second water inlet end 22 is inserted into the first water outlet end 12, and the first sealing members 13 are matched with an inner wall surface of the water passage channel 21 to form a first seal. An inner side of the first annular wall 121 communicates with the water passage channel 21, and the second sealing members 23 are matched with an inner wall surface of the second annular wall 122 to form a second seal. With the sealing cooperation between the second sealing members 23 of the water outlet hose 2 and the valve core seat 1, and the sealing cooperation between the first sealing members 13 of the valve core seat 1 and the water outlet hose 2, a double-sealed structure is formed between the water outlet hose 2 and the valve core seat 1, thereby reducing the risk of water leakage of the faucet due to failure of the sealing member.

Figure 7:
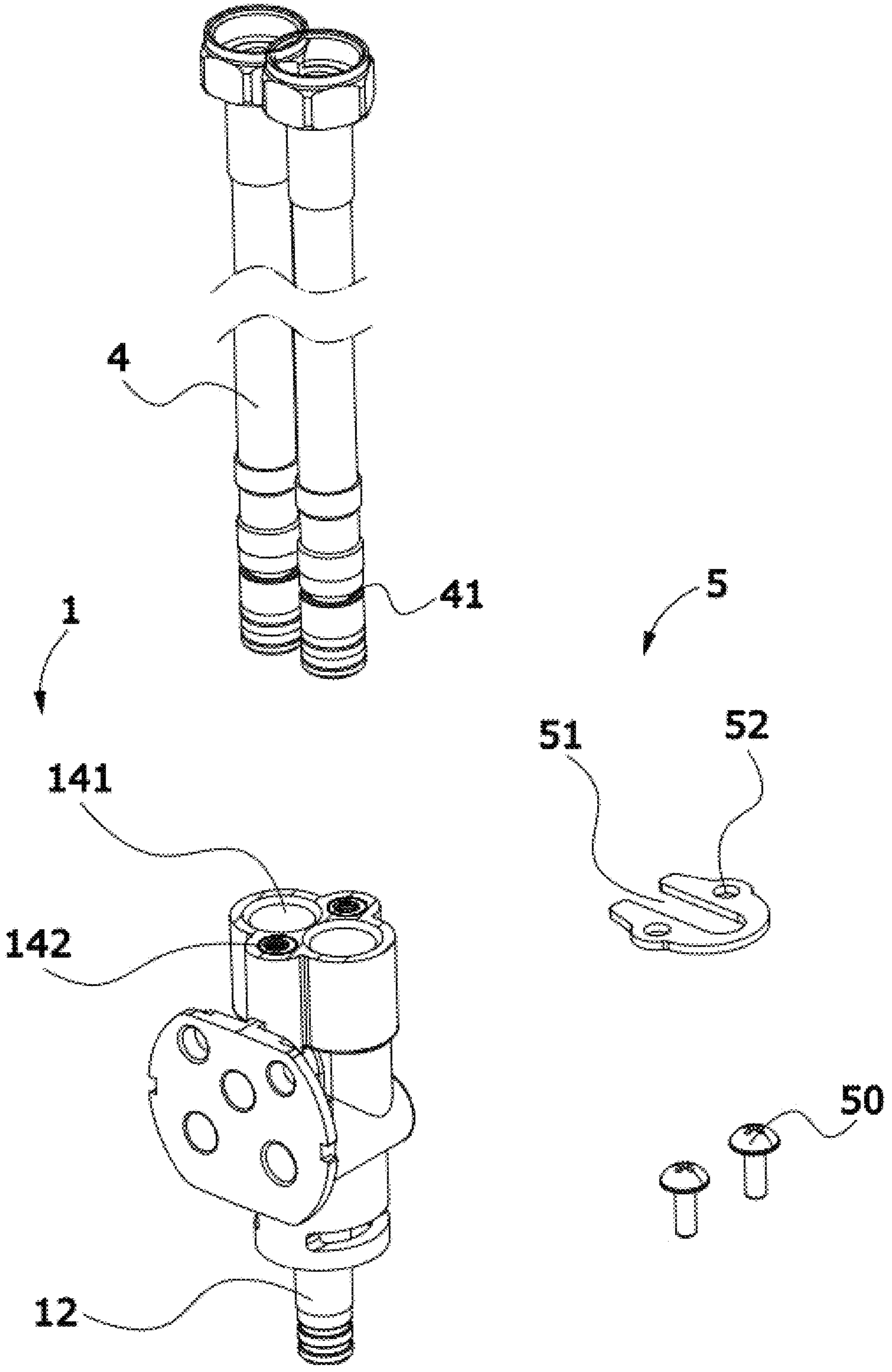
FIG. 7 is an exploded view of the valve core seat and the water inlet pipe according to an embodiment of the present disclosure.

An end of the second annular wall 122 near the water outlet hose 2 is provided with a plurality of through grooves 123, and the second water inlet end 22 is provided with a second engagement groove 221 having an annular profile, and the second engagement groove 221 is provided above the second sealing grooves 222. When the water outlet hose 2 is inserted into the valve core seat 1, the through groove 123 corresponds to the second engagement groove 221, and a fastener 3 is engaged with the second engagement groove 221 through the through groove 123 from an outer side of the second annular wall 122. As shown in FIG. 7, in this embodiment, two through grooves 123 are provided, and the two through grooves 123 are arranged on opposite sides. The fastener 3 includes an outer wall 31 having an opening and fastening protrusions 32 arranged on an inner side of the outer wall 31. The fastening protrusions 32 are arranged corresponding to the through grooves 123. The fastener 3 is engaged with the through grooves 123 of the valve core seat 1, and the fastener 3 is installed in the hollow cavity 61 of the main body 6 along with the valve core seat 1. The water outlet hose 2 is inserted downward from an upper end of the main body 6. When the second water inlet end 22 of the water outlet hose 2 is plugged into the first water outlet end 12 of the valve core seat 1, the water outlet hose 2 pushes the fastener 3 to open the fastener 3, and the water outlet hose 2 continues to be inserted downward, the fastening protrusions 32 come to the second engagement groove 221, so that the fastener 3 can tightly clamp the water outlet hose 2, and the water outlet hose 2 can be fastened to the valve core seat 1. The water outlet hose 2 can rotate freely at 360 degrees on the valve core seat 1 to prevent winding. This structure can achieve integrated quick installation and anti-shear function, thereby improving assembly efficiency and structural performance.

The water outlet assembly further includes a support frame 70, a support pole 71 provided on the support frame 70, and a spring 72 sleeved on the support pole 71. The water outlet hose 2 passes through the support frame 70, the support pole 71 and the spring 72. The water outlet hose 2 is limited by the spring 72 and is fixed on the support frame 70. In this embodiment, a lower end of the support frame 70 is provided with a rotating part 701 and a positioning part 702 from bottom to top. A second positioning shoulder 622 is arranged above the first positioning shoulder 621. A first gasket 623 is provided on the second positioning shoulder 622, a guide ring 703 and an engagement ring 704 are sleeved on the rotating part 701, the rotating part 701 is inserted into the upper port 62, and the positioning part 702 is limited by the second positioning shoulder 622 and located on the first gasket 623. A sidewall of the main body 6 is provided with a second fixing hole 624, and a second screw 625 is screwed in the second fixing hole 624 and is biased against the engagement ring 704. An upper end of the support frame 70 is provided with a support arm 705 that is perpendicular to a lower end of the support frame 70. An end of the support arm 705 is provided with a connection hole 706, and the other end of the support arm 705 is provided with a positioning opening 707, and the positioning opening 707 is provided on the side away from the second water inlet end 22 of the water outlet hose 2. The connection hole 706 is connected to the support pole 71, the spring 72 is sleeved on the support pole 71, the water outlet hose 2 passes through the spring 72 and the support pole 71, and the water outlet end of the water outlet hose 2 is clamped on the positioning opening 707.

Figure 8:
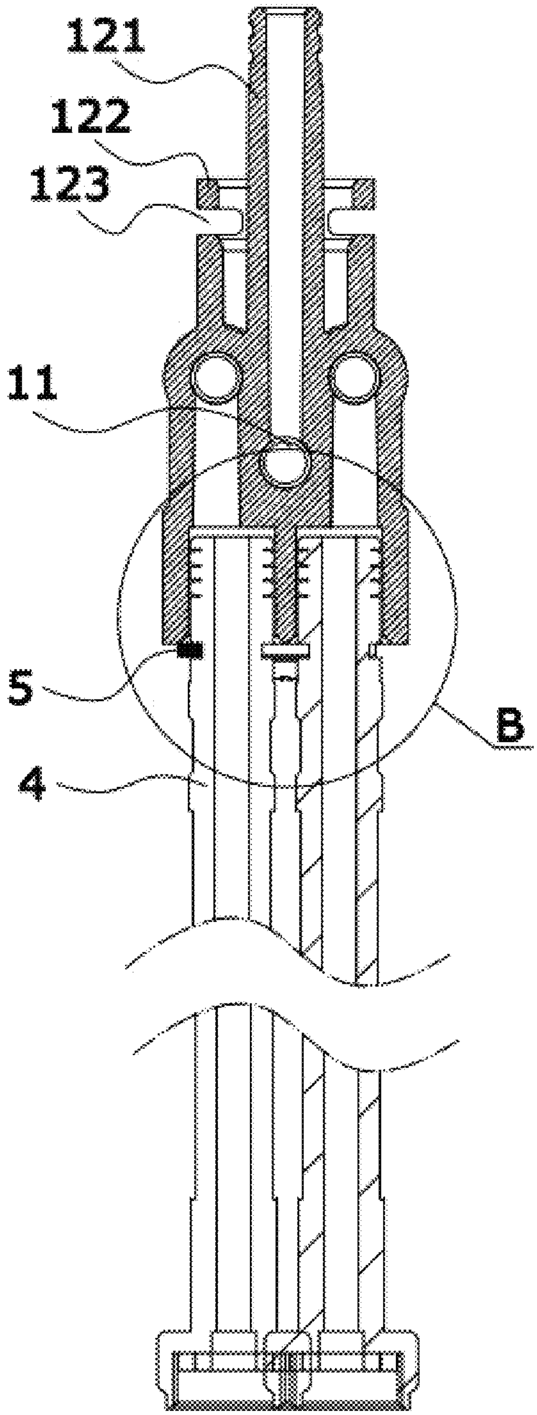
FIG. 8 is a cross-sectional view of the valve core seat and water inlet pipe according to an embodiment of the present disclosure.

As shown in FIG. 8, the first water inlet end 14 is provided with at least two water inlet ports 141, each of the water inlet ports 141 is connected with a water inlet pipe 4. Each water inlet pipe 4 is fixed to the first water inlet end 14 via a fixing plate 5. In this embodiment, the first water inlet end 14 is provided with two water inlet ports 141, and the two water inlet ports 141 are connected to a cold water inlet pipe 4 and a hot water inlet pipe 4, respectively.

Figure 9:
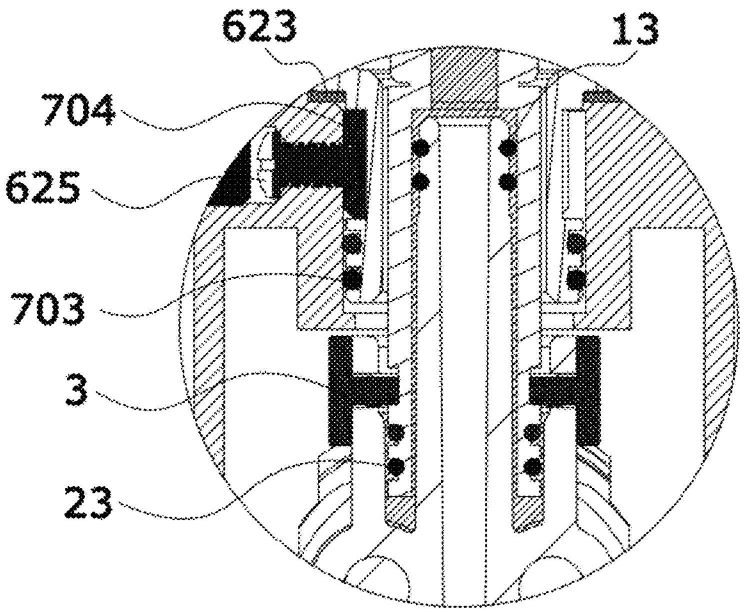
FIG. 9 is a partially enlarged view A of the embodiment of the present disclosure.
Figure 10:
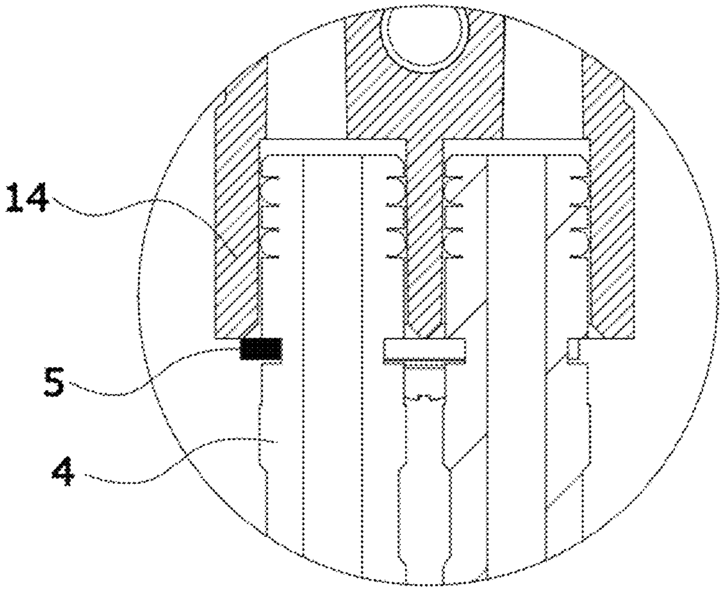
FIG. 10 is a partially enlarged view B of the embodiment of the present disclosure.

Referring to FIG. 9 and FIG. 10, the water inlet pipe 4 is provided with a first engagement groove 41 having an annular profile, the fixing plate 5 is provided with a slot 51 and through holes 52 on both sides of the slot 51. The first water inlet end 14 is provided with at least two first fixing holes 142, and the first fixing holes 142 are arranged corresponding to the through holes 52. The water inlet pipe 4 is inserted into the water inlet port 141, and an upper end surface of the first engagement groove 41 is parallel to a lower end surface of the valve core seat 1. The fixing plate 5 is inserted into the first engagement groove 41 from the side of the water inlet pipe 4 through the slot 51, the first fixing holes 142 are aligned with the through holes 52, and the fixing plate 5 is fixedly connected to the valve core seat 1 by a first screw 50 to prevent the water inlet pipe 4 from being winded and sheared.

Figure 2:
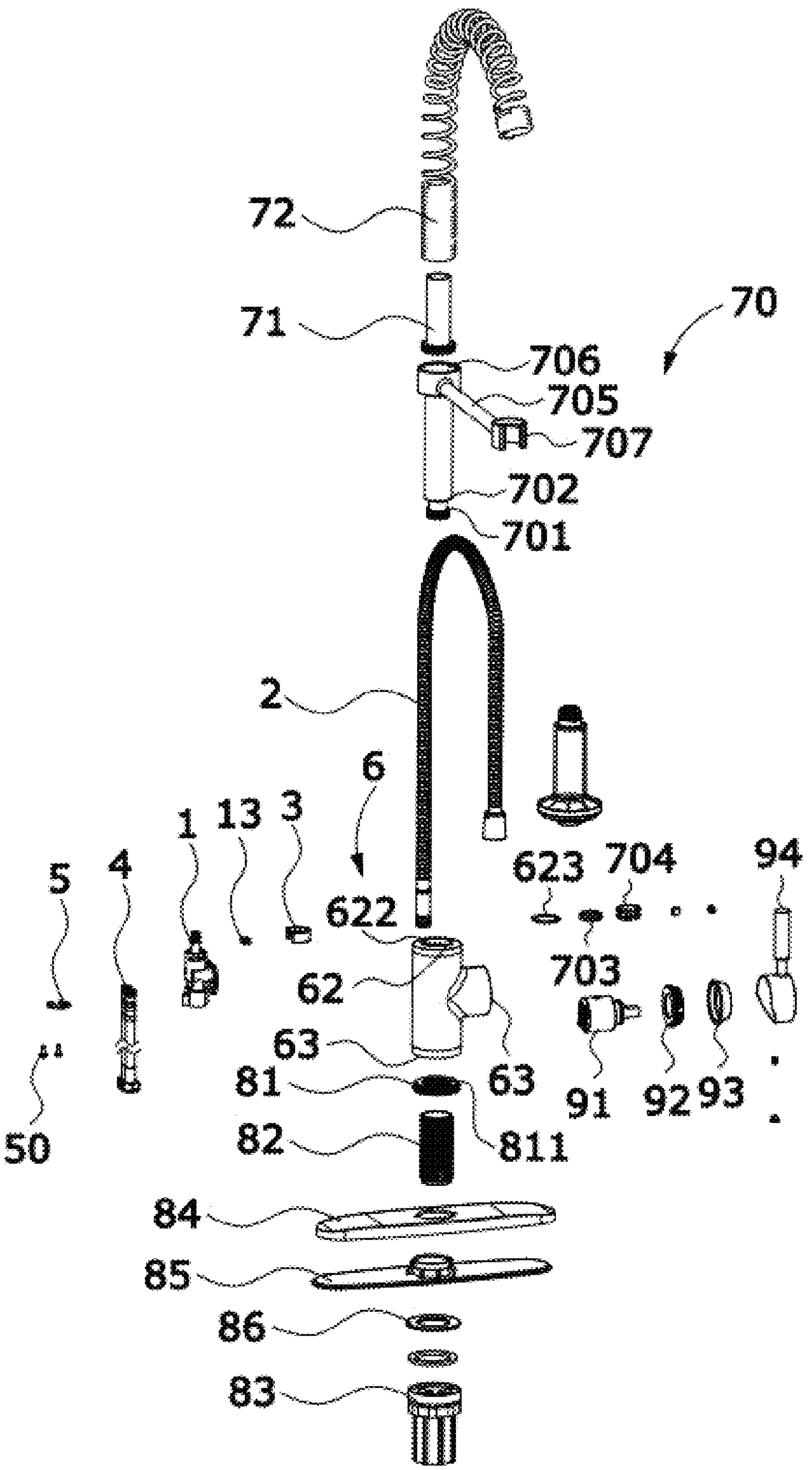
FIG. 2 is an exploded view of an embodiment of the present disclosure.
Figure 3:
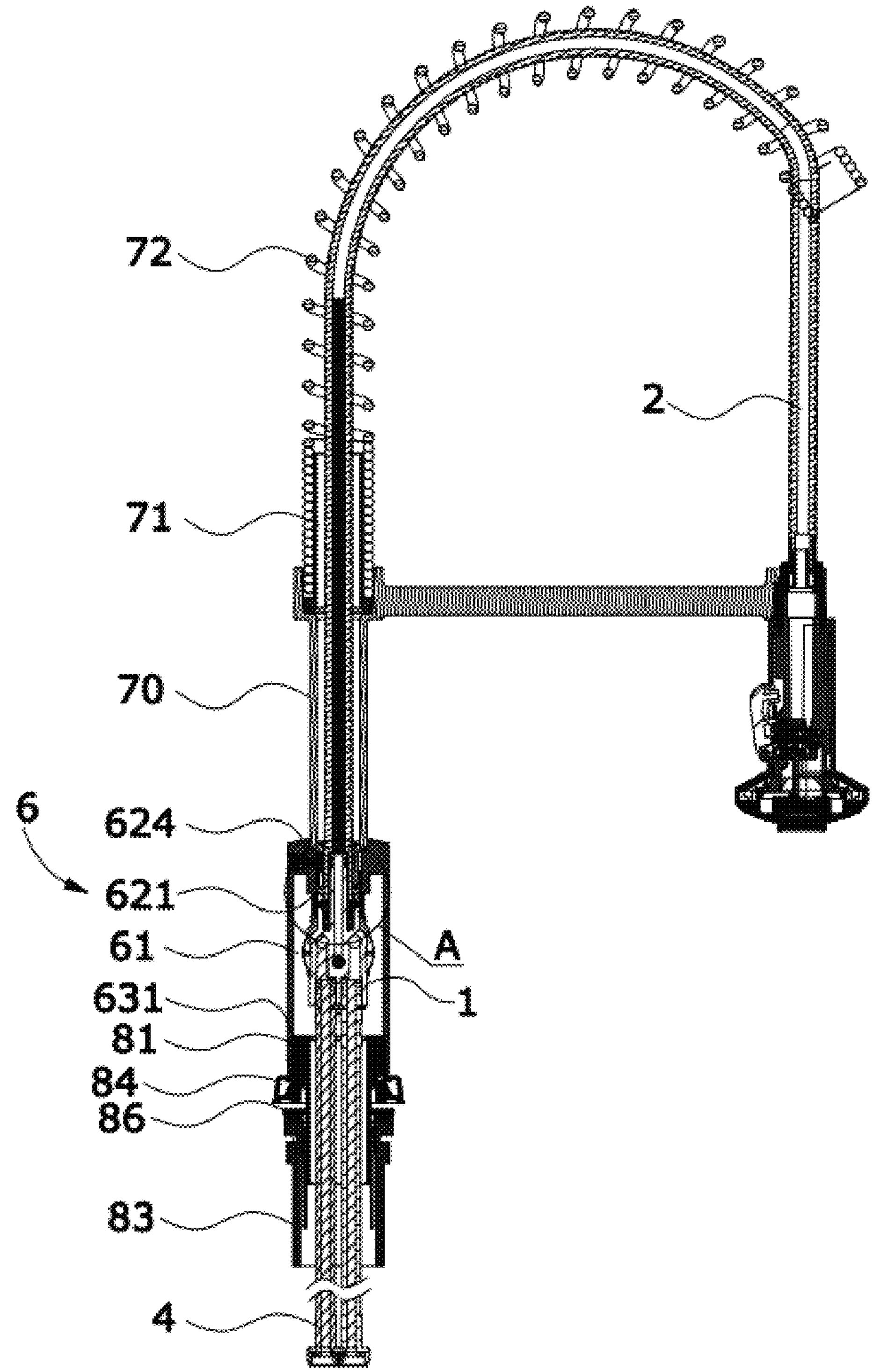
FIG. 3 is a first cross-sectional view of an embodiment of the present disclosure.
Figure 4:
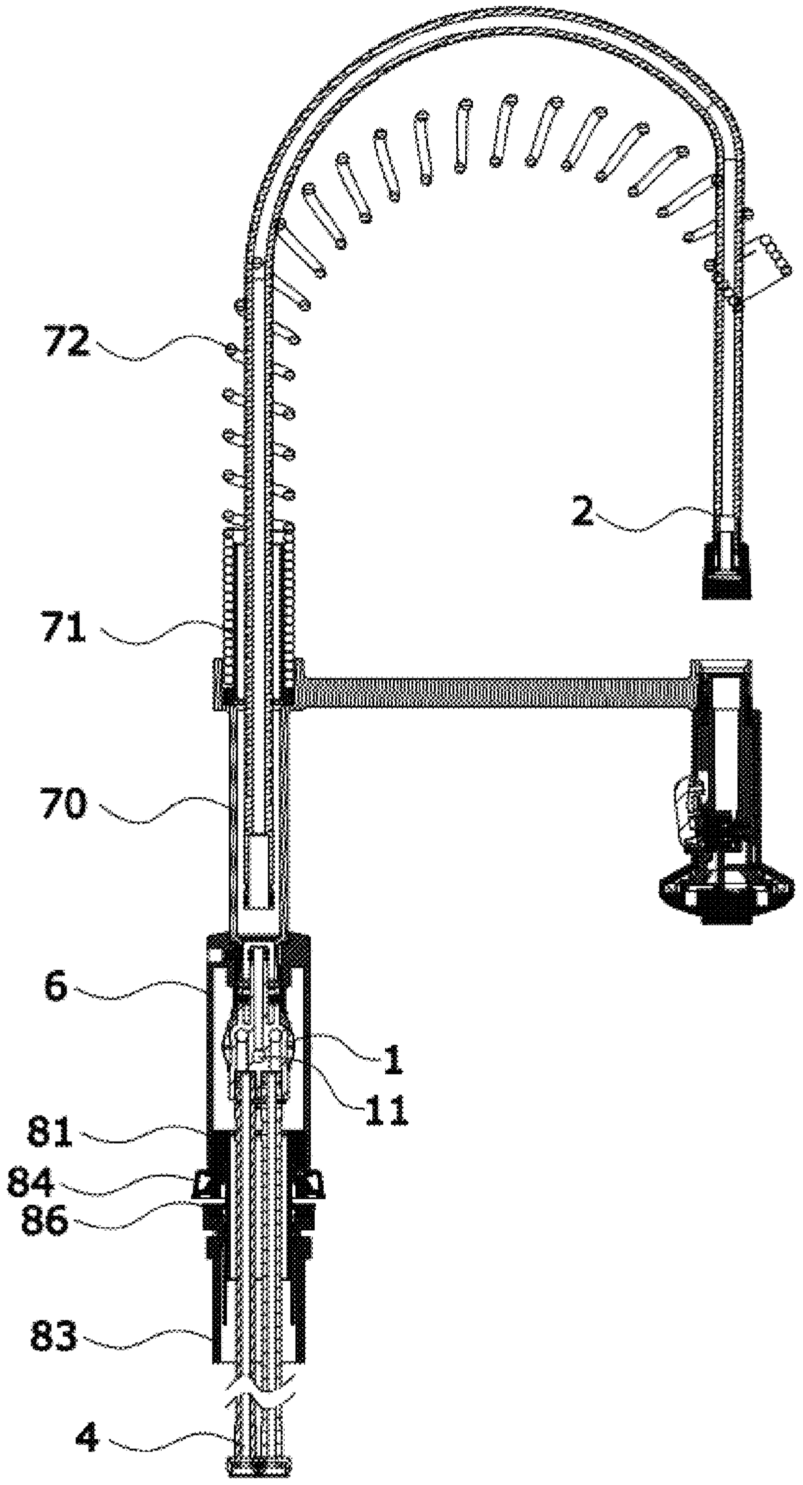
FIG. 4 is a second cross-sectional view of the embodiment of the present disclosure.

Referring to FIG. 2, an inner wall surface of the lower port 63 is provided with a first connection portion 631. The first connection portion 631 is connected to an adapter 81. An inner wall surface of the adapter 81 is provided with a second connection portion 811, and the second connection portion 811 is connected to the installation assembly. Of course, the lower port 63 may not need the adapter 81, and the installation assembly is directly connected to the first connection portion 631. In this embodiment, the installation assembly is connected to the lower port 63 through the adapter 81.

In this embodiment, the installation assembly includes a support tube 82, a second gasket 86 and a quick-release nut 9283 that are movably mounted on the support tube 82. The support tube 82 is inserted and connected to the mounting hole of the mounting table. The second gasket 86 and the quick-release nut 9283 are inserted into the support tube 82 from the lower end of the support tube 82, and the second gasket 86 is biased against the bottom surface of the mounting table through the quick-release nut 9283. In this embodiment, a panel 84 and a bottom plate 85 disposed below the panel 84 are also provided between the lower end surface of the main body 6 and the mounting table. The panel 84 and the bottom plate 85 are sequentially mounted on the support tube 82, the panel 84 is biased against the lower end surface of the main body 6, and the bottom plate 85 is biased against the upper surface of the mounting table.

The above description includes only preferred embodiment/s of the present disclosure and is not intended to limit the present disclosure. For those skilled in the art, the present disclosure may have various modifications and variations. Any modification, equivalent substitution, improvement, etc. made within the spirit and principle of the present disclosure shall be included in the protection scope of the present disclosure.

What is claimed is:

1. A double-sealed faucet with a rotatable water outlet hose, comprising:

a valve core seat, wherein the valve core seat comprises a mixing chamber and a first water outlet end communicating with the mixing chamber, the first water outlet end has a first annular wall and a second annular wall arranged in two layers from inside to outside, the first annular wall and the second annular wall are arranged concentrically, the first annular wall is higher than the second annular wall, and an upper end of the first annular wall is provided with a plurality of first sealing members; and a water outlet hose, wherein the water outlet hose comprises a water passage channel and a second water inlet end communicating with the water passage channel, the second water inlet end is provided with a plurality of second sealing members, the second water inlet end is inserted into the first water outlet end, the first sealing members are matched with an inner wall surface of the water passage channel to form a first seal, an inner side of the first annular wall communicates with the water passage channel, and the second sealing members are matched with an inner wall surface of the second annular wall to form a second seal;

wherein an end of the second annular wall near the water outlet hose is provided with a plurality of through grooves, the second water inlet end is provided with a second engagement groove having an annular profile, when the water outlet hose is inserted into the valve core seat, the through grooves correspond to the second engagement groove, and a fastener passes through the through grooves from an outer side of the second annular wall to be engaged with the second engagement groove.

2. The double-sealed faucet with a rotatable water outlet hose according to claim 1, wherein two through grooves are provided, and the two through grooves are arranged oppositely, the fastener includes an outer wall having an opening and a fastening protrusion provided on an inner side of the outer wall, and the fastening protrusion corresponds to the through grooves.

3. The double-sealed faucet with a rotatable water outlet hose according to claim 1, wherein the second water inlet end is provided with a plurality of second sealing grooves, and the second sealing members are sleeved on the second sealing grooves, the second sealing grooves are provided below the second engagement groove.

4. The double-sealed faucet with a rotatable water outlet hose according to claim 1, wherein the valve core seat further comprises a first water inlet end, the first water inlet end is provided with at least two water inlet ports, each water inlet port is connected to a water inlet pipe by insertion, and the water inlet pipe is fixed to the first water inlet end by a fixing plate.

5. The double-sealed faucet with a rotatable water outlet hose according to claim 4, wherein the water inlet pipe is provided with a first engagement groove having an annular profile, the fixing plate is provided with a slot and through holes on both sides of the slot, the first water inlet end is provided with at least two first fixing holes, the first fixing holes are arranged corresponding to the through holes, the water inlet pipes are inserted into the water inlet ports, the fixing plate is inserted into the first engagement groove from a side of the water inlet pipe through the slot, the first fixing holes are aligned with the through holes, and the fixing plate is fixed to the valve core seat by a first screw.

6. The double-sealed faucet with a rotatable water outlet hose according to claim 1 further comprising a main body, wherein the main body comprises a hollow cavity, and an upper port and a lower port communicating with the hollow cavity, the upper port has a first positioning shoulder, the valve core seat enters from the lower port and is accommodated in the hollow cavity, and the valve core seat is limited by the first positioning shoulder.

7. The double-sealed faucet with a rotatable water outlet hose according to claim 6 further comprising a support frame, wherein a lower end of the support frame is provided with a rotating part and a positioning part from bottom to top, the upper port also has a second positioning shoulder, the second positioning shoulder is arranged above the first positioning shoulder, and a first gasket is arranged on the second positioning shoulder; a guide ring and an engagement ring are sleeved on the rotating part, the rotating part is inserted into the upper port, and the positioning part is limited by the second positioning shoulder and placed on the first gasket; a sidewall of the main body is provided with a second fixing hole, and a second screw is fixed to the second fixing hole and is biased against the engagement ring.

8. The double-sealed faucet with a rotatable water outlet hose according to claim 6, wherein an upper end of the support frame is provided with a support arm in perpendicular to the lower end of the support frame, a first end of the support arm is provided with a connection hole, and a second end of the support arm is provided with a positioning opening, the positioning opening is located on a side away from the second water inlet end of the water outlet hose, the connection hole is connected to a support pole, a spring is sleeved on the support pole, and the water outlet hose passes through the spring and the support pole, the water outlet end of the water outlet hose is clamped on the positioning opening.

9. The double-sealed faucet with a rotatable water outlet hose according to claim 6, wherein an inner wall surface of the lower port is provided with a first connection part, the first connection part is connected to an adapter, an inner wall surface of the adapter is provided with a second connection part, and the second connection part is connected with a support pipe, and a movable quick-release nut is sleeved on the support pipe.

10. The double-sealed faucet with a rotatable water outlet hose according to claim 9, wherein a panel, a bottom plate, and two second gaskets are movably connected to the support tube in sequence, and the panel, the bottom plate, and the second gaskets are provided between an end surface of the lower port and the quick-release nut.

11. The double-sealed faucet with a rotatable water outlet hose according to claim 6 further comprising a valve core, a nut arranged on the valve core by pressing, a flange covering the nut, and a handle, wherein the main body further comprises a side port communicating with the hollow cavity, the valve core enters the hollow cavity from the side port and is biased against the valve core seat, the nut tightly compresses the valve core and is locked to the side port, and a connection handle of the valve core passes through the nut and the flange, and the handle is connected to the connection handle of the valve core to operate the valve core.

* * * * *